United States Patent
Jacobson et al.

(10) Patent No.: US 10,340,812 B2
(45) Date of Patent: Jul. 2, 2019

(54) FLEXIBLE POWER CONVERTER ARCHITECTURE BASED ON INTERPOSER AND MODULAR ELECTRONIC UNITS

(71) Applicant: Raytheon Company, Waltham, MA (US)

(72) Inventors: Boris S. Jacobson, Westford, MA (US);
Steven D. Bernstein, Brighton, MA (US); Steven M. Lardizabal, Westford, MA (US); Jason Adams, Medway, MA (US); Jeffrey R. Laroche, Austin, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/703,455

(22) Filed: Sep. 13, 2017

(65) Prior Publication Data
US 2019/0081567 A1    Mar. 14, 2019

(51) Int. Cl.
*H02M 3/335* (2006.01)
*H02M 7/00* (2006.01)
(Continued)

(52) U.S. Cl.
CPC ............ *H02M 7/003* (2013.01); *H01F 27/28* (2013.01); *H01F 27/42* (2013.01); *H02M 3/335* (2013.01);
(Continued)

(58) Field of Classification Search
CPC .... H02M 3/155; H02M 3/156; H02M 3/1584; H02M 2001/0067; H02M 2001/007; H02M 2001/008; H02M 7/04; H02J 50/20
See application file for complete search history.

(56) References Cited

U.S. PATENT DOCUMENTS 8,461,669 B2   6/2013  Yang
8,558,344 B2   10/2013 Chen
(Continued)

FOREIGN PATENT DOCUMENTS

WO    2011103259 A3   1/2012

OTHER PUBLICATIONS

Araghchini et al.; "A Technology Overview of the PowerChip Development Program"; IEEE Transactions on Power Electronics; vol. 28; No. 9; Sep. 2013; pp. 4182-4201.
(Continued)

*Primary Examiner* — Fred E Finch, III
*Assistant Examiner* — Ishrat F Jamali
(74) *Attorney, Agent, or Firm* — Cantor Colburn LLP

(57) ABSTRACT

A modular high-power converter system includes an electronic power distribution unit configured to output an analog current (AC) voltage to a power bus, and at least one Transmit or Receive Integrated Microwave Module (T/RIMM) that includes a voltage converter unit and a transmitter and receiver (T/R) unit. The voltage converter unit includes at least one analog-to-digital converter (ADC) to convert the AC voltage into a direct current (DC) voltage having a first DC voltage level. The transmitter and receiver (T/R) unit includes a modular-based DC/DC converter to convert the DC voltage into a second DC voltage having a second voltage. The modular-based DC/DC converter includes a modular power converter unit configured to generate the second DC voltage. The modular converter unit is configured to be independently interchangeable with a different modular converter unit.

18 Claims, 15 Drawing Sheets

(51) Int. Cl.
  *H01F 27/28* (2006.01)
  *H01F 27/42* (2006.01)
  *H02M 7/04* (2006.01)
  *H02M 1/00* (2006.01)

(52) U.S. Cl.
  CPC ........ *H02M 7/04* (2013.01); *H02M 2001/007* (2013.01); *H02M 2001/008* (2013.01)

(56) References Cited

U.S. PATENT DOCUMENTS

| | | | |
|---|---|---|---|
| 2011/0018360 A1* | 1/2011 | Baarman | H02J 7/0027 307/104 |
| 2013/0328165 A1 | 12/2013 | Harburg | |
| 2014/0084858 A1* | 3/2014 | Kim | H02J 7/025 320/108 |
| 2015/0340422 A1 | 11/2015 | Lee | |
| 2016/0036330 A1 | 2/2016 | Sturcken | |
| 2016/0064470 A1 | 3/2016 | Mihailovich | |
| 2017/0013663 A1* | 1/2017 | Bora | H04W 52/245 |

OTHER PUBLICATIONS

Bellenger et al. "Silicon Interposers with Integrated Passive Devices: Ultra-Miniaturized Solution using 2.5D Packaging Platform" 2012, pp. 1-8.

* cited by examiner

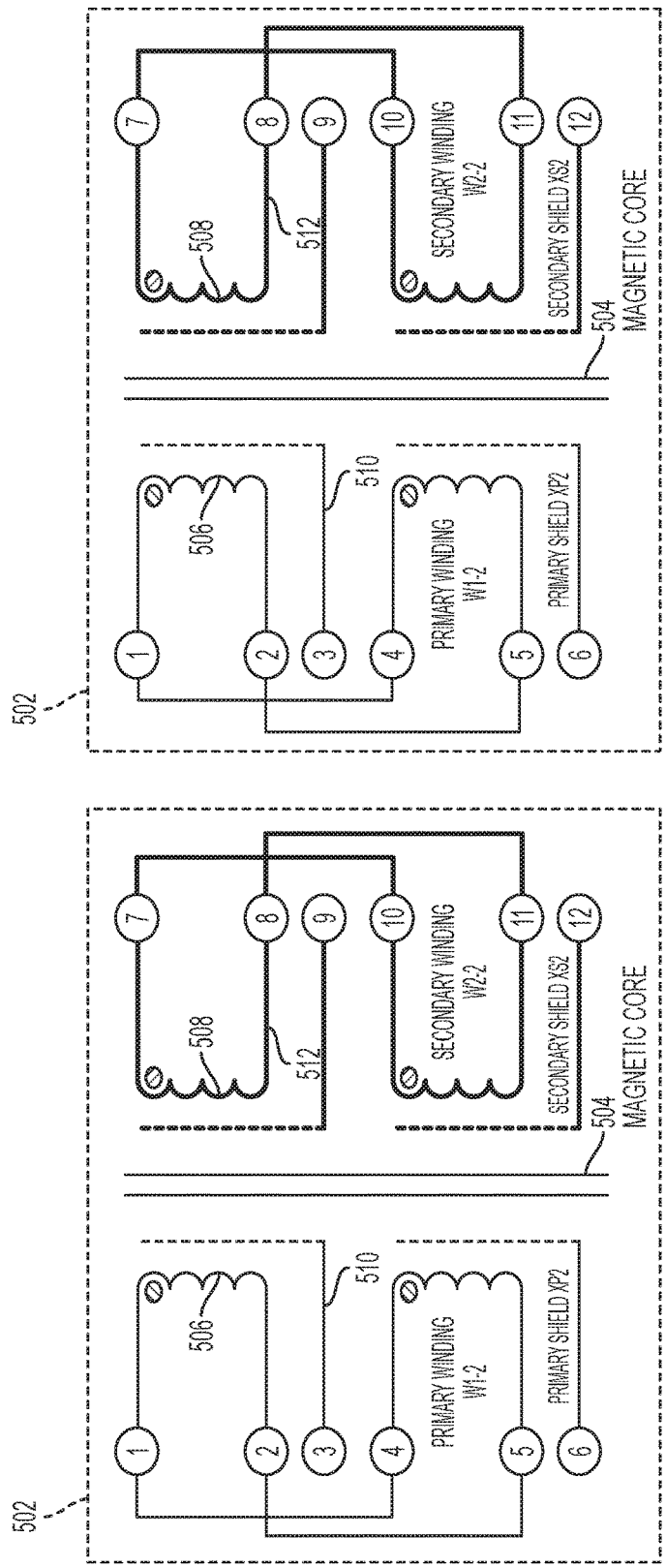

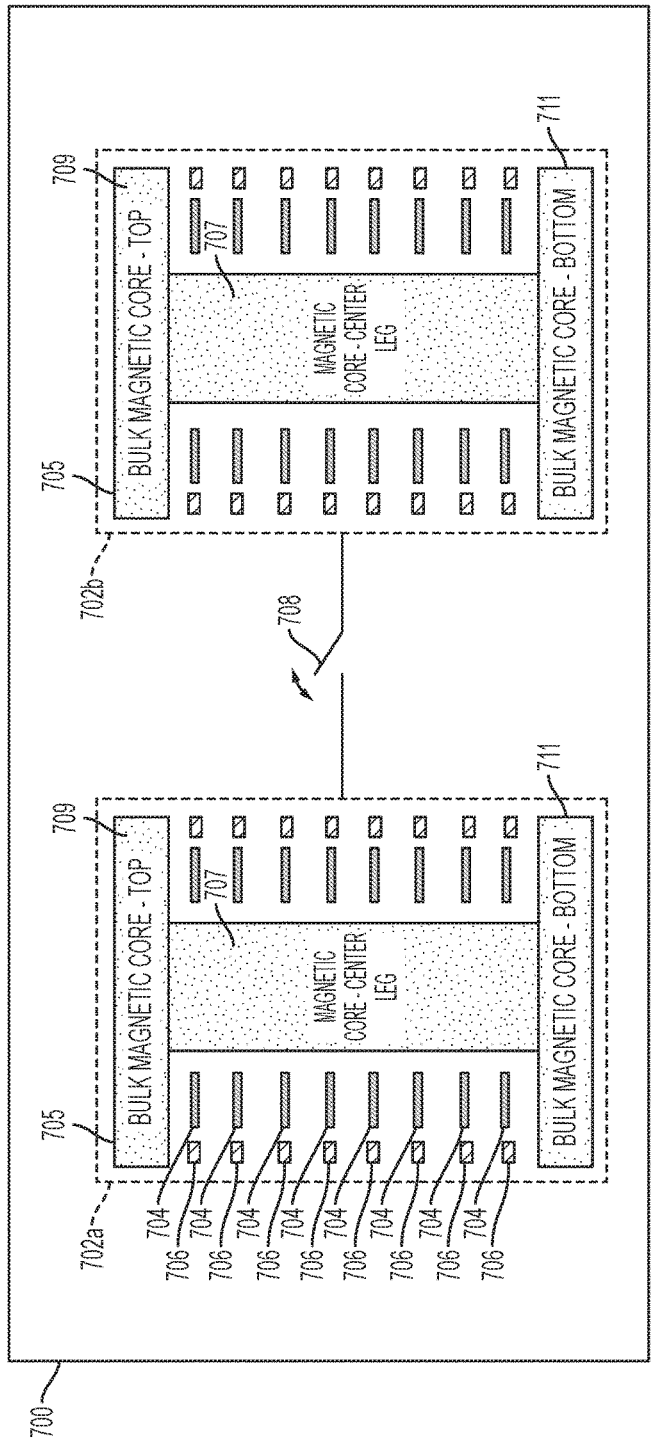
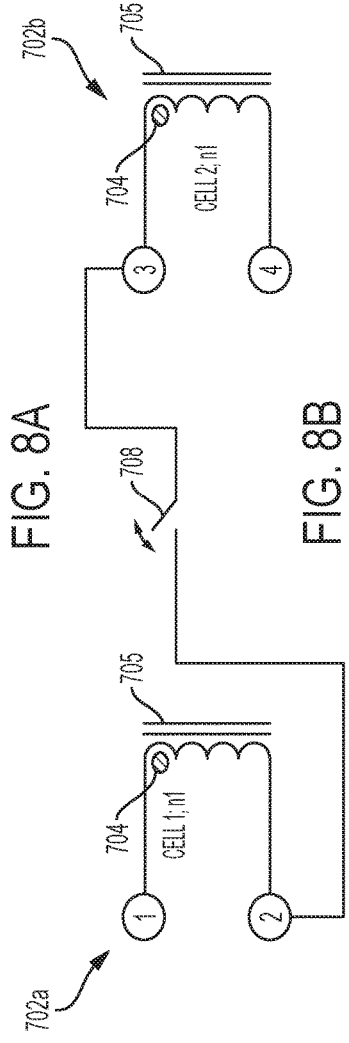
FIG. 8A
FIG. 8B

FLEXIBLE POWER CONVERTER ARCHITECTURE BASED ON INTERPOSER AND MODULAR ELECTRONIC UNITS

GOVERNMENT LICENSE RIGHTS

This invention was made with Government support under N00014-13-C-0231 awarded by the US Navy. The Government has certain rights in the invention.

BACKGROUND

The present disclosure relates generally to power distribution systems, and more particularly, to transmitter/receiver antenna power systems.

Multi-phase power distribution systems are capable of delivering power to one or more various vehicle electronic sub-systems such as, for example, Transmit or Receive Integrated Microwave Module (T/RIMM) antenna arrays. These T/RIMM antenna arrays operate according to a direct current (DC) voltage supply. However, conventional T/RIMM antenna arrays are incapable of individually converting alternating current (AC) prime power into a DC voltage. Moreover, it is not uncommon for the T/RIMM antenna arrays to be located at extremely far distances away from the prime power source. For example, the prime power source may be located at the stern of a sea vessel, while the T/RIMM antenna arrays are located at the bow of the vessel. The distances between the stern and the bow can reach distances of over 500 feet (ft.), for example.

To facilitate the distribution of prime power across such large distances to convert AC voltage to DC voltage, conventional multi-phase AC power systems include one or more intermediate power distribution sub-systems. The intermediate power distribution sub-systems distribute power between the prime power source and a respective antenna array using a multitude of large bulky cables/buses sized to handle the high power. An intermediate power distribution sub-system typically includes, for example, various multiphase AC voltage transfer switches 116 and a power converter (e.g., AC-to-DC converter). The AC voltage transfer switches maintain power continuity while distributing the power through the power cables/buses. The AC-to-DC converter rectifies the prime power and outputs a stepped-down DC voltage to the antenna arrays. The multiple power cables/buses implemented to distribute the prime power between the prime power source and the loads, e.g., the T/RIMM antenna arrays, are implemented according to a fixed size to handle extremely high power ratings. The fixed ratings and implementation of the multi-phase power distribution system reduces the system's ability to adapt as antenna technology and T/R systems evolve over time.

SUMMARY

According to at least one non-limiting embodiment, a modular high-power converter system includes an electronic power distribution unit configured to output an alternating current (AC) voltage to a power bus, and at least one Transmit or Receive Integrated Microwave Module (T/RIMM) configured to perform at least one of signal transmission or signal reception. The T/RIMM includes an electronic voltage converter unit and at least one electronic transmitter and receiver (T/R) unit. The electronic voltage converter unit includes at least one alternating current-to-direct current (AC/DC) in signal communication with the power bus. The AC/DC is configured to convert the AC voltage into a direct current (DC) voltage having a first DC voltage level. The transmitter and receiver (T/R) unit is in signal communication with the output of the AC/DC. The T/R unit includes a modular-based DC-to-DC (DC/DC) converter connected to the output of the AC/DC to convert the DC voltage into a second DC voltage having a second voltage different from the first voltage level. The modular-based DC/DC converter includes at least one modular power converter unit configured to generate the second DC voltage. The at least one modular converter unit is configured to be independently interchangeable with a different modular converter unit such that the modular-based D/DC converter can be dynamically reconfigured in real-time without disconnecting power.

According to another non-limiting embodiment, an electronic transceiver/receiver (T/R) unit is included in a Transmit or Receive Integrated Microwave Module (T/RIMM), which is installed in a modular high-power converter system. The T/R unit includes a power amplifier and a modular direct current-to-direct current (DC/DC) converter. The power amplifier is connected to an antenna to perform at least one of signal transmission or signal reception. The modular DC/DC converter is configured to convert a first DC voltage into a reduced second DC voltage that drives the power amplifier. The modular-based DC/DC converter includes at least one modular power converter unit configured to generate the second DC voltage. The modular converter unit is further configured to be independently interchangeable with a different modular converter unit.

According to yet another non-limiting embodiment, a method is provided for assembling a plurality of modular converter units to construct a modular-based DC/DC converter. The method includes connecting an electronic power distribution unit configured to a power bus that is configured to receive an alternating current (AC) voltage, and connecting an electronic voltage converter unit to the power bus. The voltage converter includes at least one alternating current-to-direct current (AC/DC), which is configured to convert the AC voltage into a direct current (DC) voltage having a first DC voltage level. The method further includes connecting at least one electronic transmitter and receiver (T/R) unit with the output of the AC/DC. The at least one T/R unit includes a modular-based DC-to-DC (DC/DC) converter connected to the output of the AC/DC. The method further includes forming a plurality of interchangeable modular converter units on an interposer. The plurality of interchangeable modular converter units are configured to convert the DC voltage into a second DC voltage having a second voltage different from the first voltage level. The modular-based DC/DC converter is dynamically reconfigured in real time in response to interchanging a first modular converter unit independently with respect to remaining modular converter units without disconnecting the modular-based DC/DC converter.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIGS. 7A-7D are schematic diagrams illustrating various electrical connections of the modular transformer unit shown in FIGS. 5A-5B;

FIG. 8A is a block diagram of a modular inductor unit included in a modular-based DC/DC converter according to a non-limiting embodiment;

FIG. 8B is a schematic diagram of the modular inductor unit shown in FIG. 8A;

DETAILED DESCRIPTION

Various non-limiting embodiments provide a modular high-power converter system that includes a modular-based DC/DC converter integrated in a transmitter/receiver (T/R) unit. The modular-based DC/DC converter includes one or more individual modular power converter units. Each individual modular power converter unit is interchangeable or can be swapped with respect to every remaining modular power converter unit implemented in a given modular-based DC/DC converter. Accordingly, a more flexible high-power converter system is provided, which can easily adapt to evolving antenna technology and T/R systems. In addition, individual modular power converter units can be removed from a first modular DC/DC converter of a first vehicle, and then transferred and implemented into an entirely different vehicle.

Figure 1:
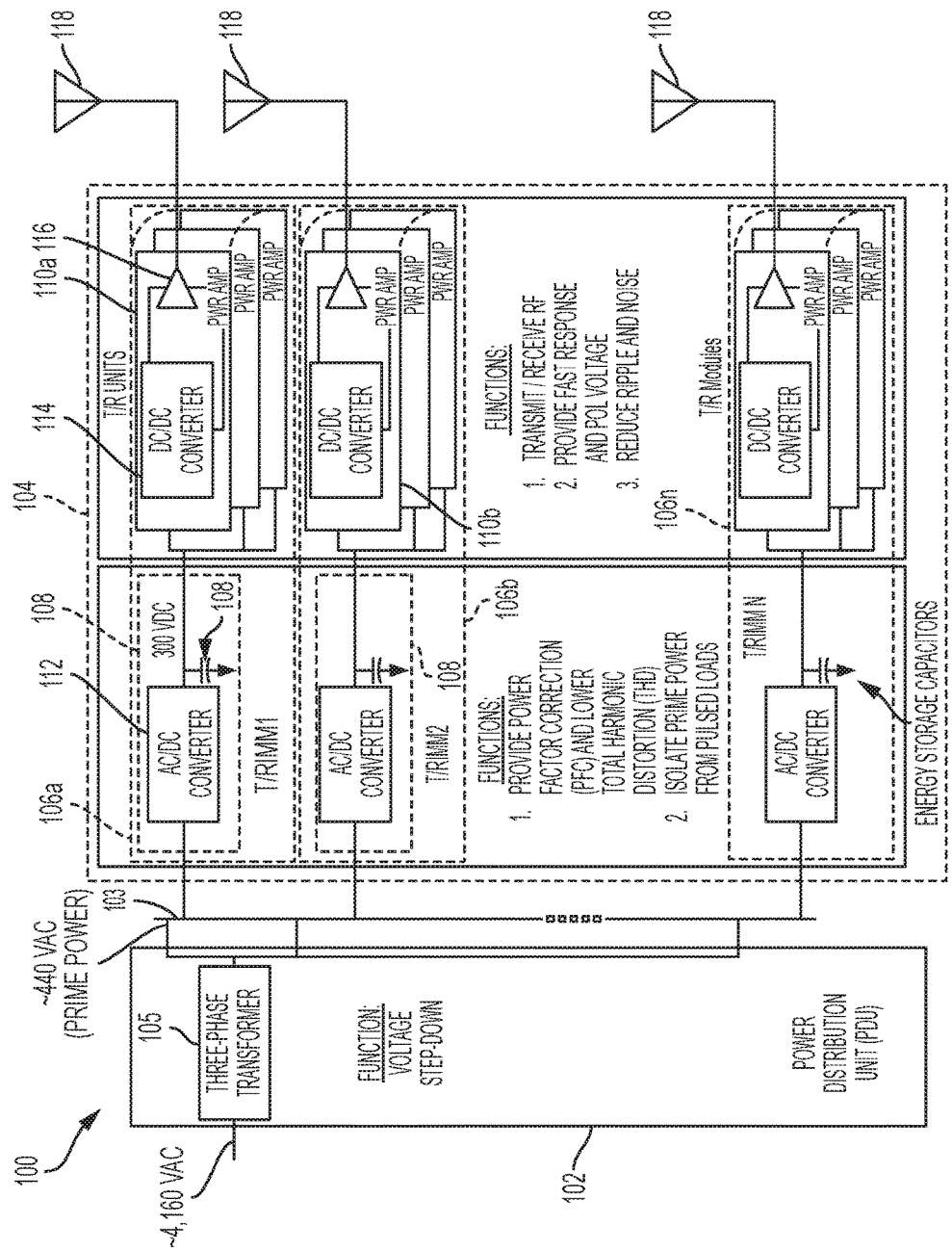
FIG. 1 is block diagram illustrating a modular high-power converter system according to a non-limiting embodiment.

With reference now to FIG. 1, a modular high-power converter system 100 is illustrated according to a non-limiting embodiment. The modular high-power converter system 100 includes an electronic power distribution unit 102 electrically coupled to an antenna array 104 via a power bus 103. The electronic power distribution unit 102 is configured to output an AC voltage to the power bus 103. The power distribution unit 102 includes a power transformer 105 such as, for example, a three-phase transformer 105. The power transformer 105 is configured to convert an input AC voltage having a first voltage level (e.g., about 4,160 VAC) into an AC voltage having a second voltage level (e.g., about 440 VAC). Thus, the power distribution unit 102 can step down a very high-voltage into a lower voltage that can be utilized by the antenna array 104.

The antenna array 104 includes one or more T/RIMMs 106a-106n. In at least one non-limiting embodiment, the antenna array 104 includes a plurality of T/RIMMS 106a-106n connected in parallel to the power bus 103. Each T/RIMM 106a-106n includes an electronic voltage converter unit 108, and one or more electronic transmitter and receiver (T/R) units 110a-110n. The voltage converter unit 108 includes at least one alternating current-to-direct current (AC/DC) 112 in signal communication with the power bus 103. The AC/DC 112 is configured to convert the AC voltage (e.g., about 440 VAC) into a DC voltage having a first DC voltage level of about 300 volts (VDC). In at least one non-limiting embodiment, the voltage converter unit 104 includes an energy storage capacitor 114 connected to an output of the AC/DC 112. Accordingly, the electronic converter unit 108 can provide power factor correction (PFC) and reduce total harmonic distortion (THD). The electronic converter unit 108 is also capable of isolating the prime power (e.g., 440 VAC) from pulsed loads.

Each transmitter and receiver (T/R) unit 110 is in signal communication with the output of the AC/DC 112 included in a respective converter unit 108. The T/R unit 110 is configured to perform a signal transmission and/or signal reception based on the DC voltage output form the AC/DC 112. In one or more non-limiting embodiments, the T/R unit 110 includes a modular-based DC-to-DC (DC/DC) converter 114 and a power amplifier 116. The modular-based DC/DC converter 114 is connected to the output of the AC/DC 112, and converts the first DC voltage level into a second DC voltage. For example, the modular-based DC/DC converter 114 reduces the first DC voltage level to a second DC voltage level capable of powering the power amplifier 116. In various non-limiting embodiments, the modular-based DC/DC converter 114 includes one or more modular power converter units (not shown in FIG. 1) to generate the second DC voltage. Each modular converter unit is configured to be independently interchanged, replaced, or swapped with respect to one or more remaining modular converter units as described in greater detail below.

The power amplifier 116 includes an input connected to the modular-based DC/DC converter 114, and an output connected to an antenna 118. In at least one non-limiting embodiment, the power amplifier 116 is a radio frequency (RF) power amplifier that drives the antenna 118 to transmit and/or receive RF signals. The output of the power amplifier 116 can be actively selected based on a load of the antenna 118. Accordingly, the modular-based DC/DC converter 114 can actively adjust the second DC voltage level based on the selected power level at the output of the power amplifier 116.

Figure 2:
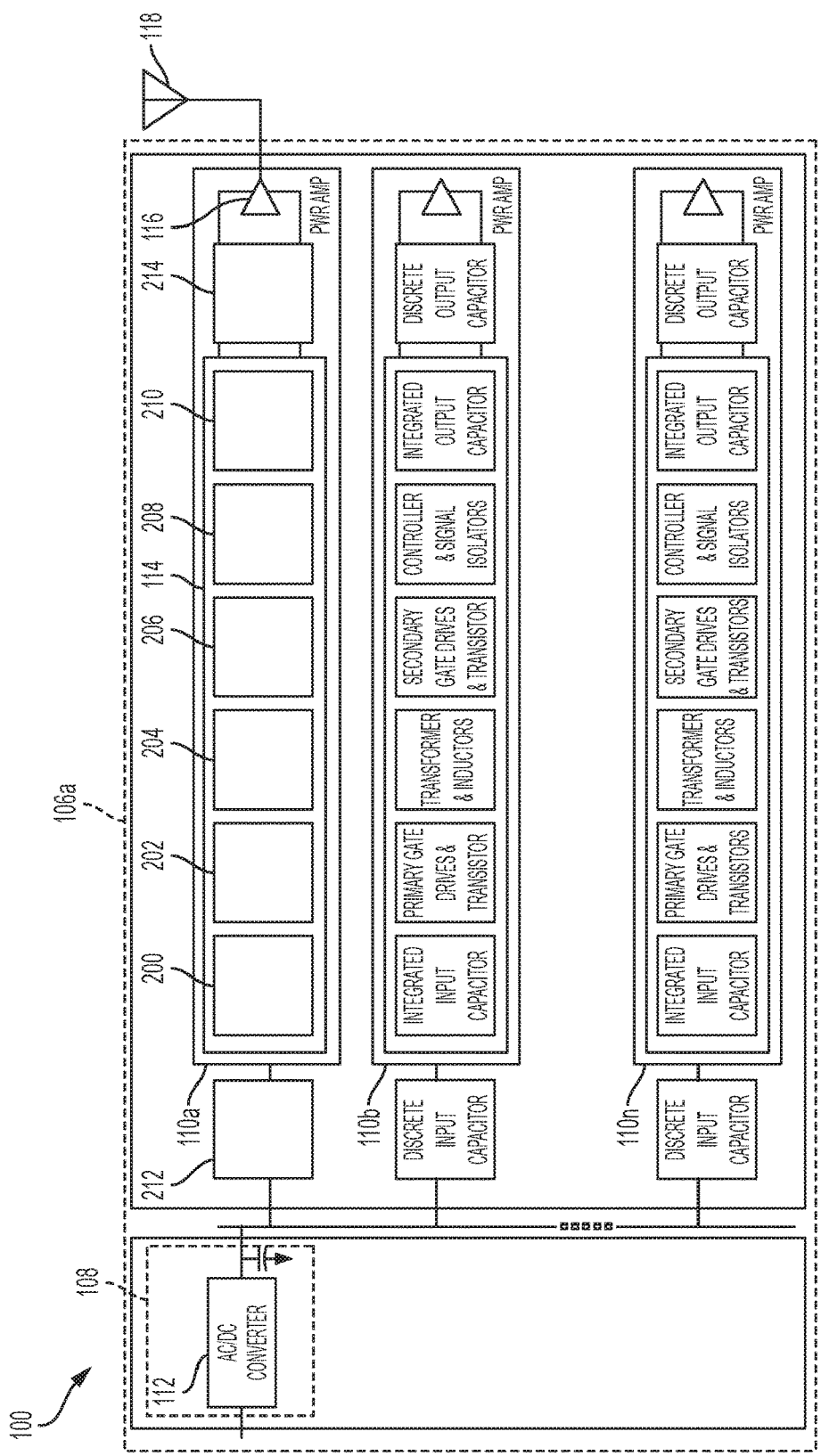
FIG. 2 is a block diagram illustrating an array of modular-based DC/DC converters integrated in a transmitter/receiver (T/R) unit of a modular high-power converter system according to a non-limiting embodiment.

Turning now to FIG. 2, a T/RIMM 106a including an array (e.g., plurality) of T/R units 110a-110n connected in parallel is illustrated according to a non-limiting embodiment. The T/R units 110a-110n include a modular-based DC/DC converter 114. Each DC/DC converter 114 includes one or more modular power converter units 200, 202, 204, 206, and 210 that operate together to generate the second DC voltage applied to the power amplifier 116. Each individual modular power converter unit 200, 202, 204, 206, and 210 can be configured to perform a different electronic power conversion operation with respect to one another. For example, the power converter units can include, but are not limited to, an integrated input capacitor modular unit 200, a primary gate driver/transistor modular unit 202, a transformer/inductor modular unit 204, a secondary gate driver/transistor modular unit 206, and a controller/signal isolator modular unit 208. Each modular converter unit 200, 202, 204, 206, and 210 is configured to be independently interchanged, replaced, or swapped with respect to one or more remaining modular converter units. An input capacitor 212 can be connected to the input of the modular-based DC/DC converter 114, and an output capacitor 214 can also be connected to the output of the modular-based DC/DC converter 114 to further reduce signal noise from a respective T/R channel.

Figure 3:
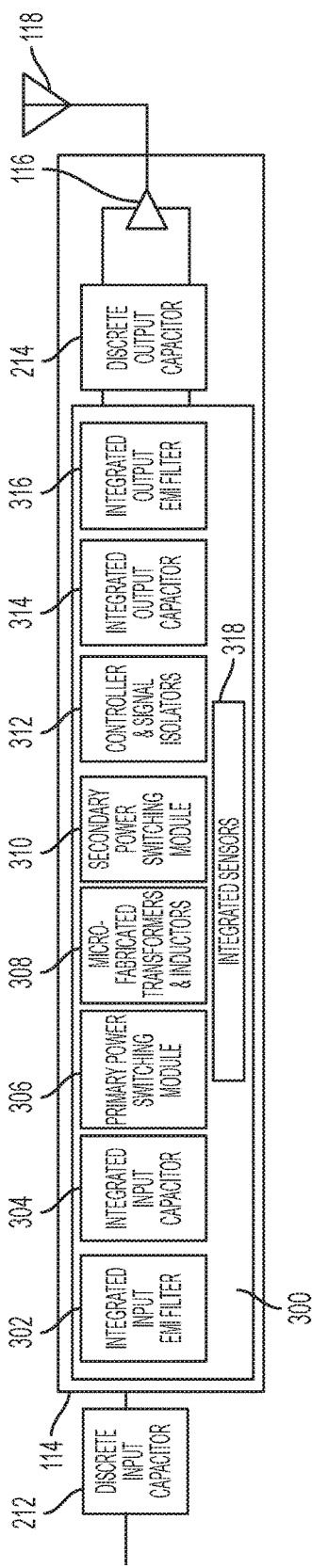
FIG. 3 is a block diagram of a modular-based DC/DC converter including a plurality of modular power converter units according to a non-limiting embodiment.

Referring to FIG. 3, a modular-based DC/DC converter 114 is illustrated according to a non-limiting embodiment. The modular-based DC/DC converter 114 includes an interposer 300 that supports one or more modular power converter units 302, 304, 306, 308, 310, 312, 314, 316, and 318, which operate together to generate a DC voltage that drives the power amplifier 116. The modular power converter units 302, 304, 306, 308, 310, 312, 314, 316, and 318 are constructed as various different power converting circuits which are individually interchangeable, i.e., are modular.

Referring to the example DC/DC converter 114 illustrated in FIG. 3, the modular power converter units include, but are not limited to, an integrated input electromagnetic interference (EMI) filter modular unit 302, an input capacitor modular unit 304, a primary power switching modular unit 306, a transformer/inductor modular unit 308, a secondary power switching modular unit 310, a controller/signal isolator modular unit 312, an output capacitor modular unit 314, an integrated output electromagnetic interference (EMI) filter modular unit 316, and an integrated sensor modular unit 318. The integrated sensor modular unit 318 can include various types of sensors including, but not limited to, voltage sensors, current sensors, and temperatures sensors. It should be appreciated that number and/or types of modular units 302, 304, 306, 308, 310, 312, 314, 316, and 318 are not limited to those illustrated in FIG. 3. In addition, a modular unit can include a combination of power converter components (e.g., a single unit can include a both a transformer circuit and an inductor circuit), or can be separated into individual modular unit (e.g., a transformer modular unit and a separate inductor modular unit).

The interposer 300 forms an electrical routing interface among each modular unit 302, 304, 306, 308, 310, 312, 314, 316, and 318 included in modular-based DC/DC converter 114. The interposer 300 can be formed from various materials including, but not limited to, silicon, glass, a combination of silicon and glass, etc. The interposer 300 having the modular unit 302, 304, 306, 308, 310, 312, 314, 316, and 318 installed thereon can be mounted onto a circuit board (not shown) as a part of the higher-level assembly.

In at least one non-limiting embodiment, the interposer 300 includes one or more intermediate substrate layers (not shown in FIG. 3). The intermediate substrate layers are located between an upper surface of the interposer 300 and a lower surface of the interposer 300 as described in greater detail below. Accordingly, one or more of the modular converter units 302, 304, 306, 308, 310, 312, 314, 316, and 318 can be mounted on the upper surface of the interposer 300, and can extend through the intermediate substrate layer(s) to reduce the surface area consumed by the circuits and components of a particular modular converter unit 302, 304, 306, 308, 310, 312, 314, 316, and/or 318.

Figure 4:
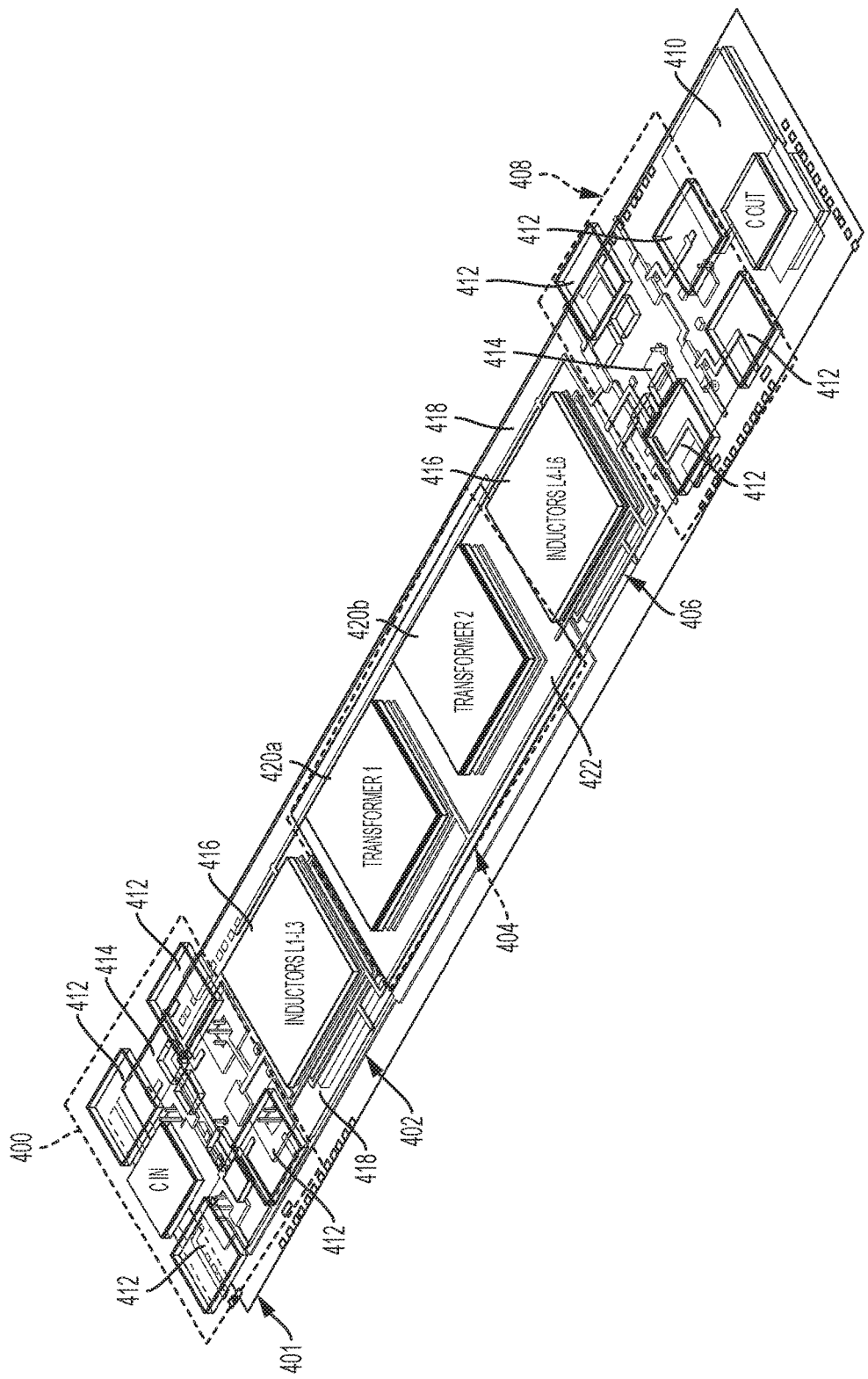
FIG. 4 is a perspective view of a modular-based DC/DC converter including a plurality of modular power converter units according to a non-limiting embodiment.

Turning to FIG. 4, arrangements of electrical circuits and components of individual modular converter units 400, 402, 404, 406, 408, and 410 mounted on a heterogeneous interposer stack 401 are illustrated according to a non-limiting embodiment. In this example, the modular converter units include, but are not limited to, a primary power switching modular unit 400, a first inductor modular unit 402, a transformer modular unit 404, a second inductor modular unit 406, a secondary power switching modular unit 408, and a controller/signal isolator modular unit 410. In one or more non-limiting embodiments, the controller/isolator modular unit 410 provides turn-on and turn-off pulse signals for the power switches and determines the functioning of the converter through an algorithm. Various power delivery techniques include, but are not limited to, include Pulse-Width Modulation (PWM), Frequency Modulation (FM), and Phase-Shift Modulation (PSM). Any control algorithm may be employed to implement this modular power converter.

In at least one non-limiting embodiment, the controller/isolator modular unit 410 includes would use a Field-Programmable Gate Array (FPGA) integrated circuit and one or more Analog to Digital converters and/or Digital to Analog converters (. However, any alternate implementation (e.g. an analog controller) will be acceptable.

The controller/signal isolator modular unit 410 can also include a signal isolator that allows coupling of galvanically-isolated signals for Electromagnetic Compatibility (EMC). Some types of signal isolators include magnetic, capacitive and optical; any type may be used to implement the modular converter described herein.

The primary power switching modular unit 400 and the secondary power switching modular unit 408 include individual active electronic submodules 412 such as transistors and gate drivers, along with signal traces and/or vias 414.

The first inductor modular unit 402 and the second inductor modular unit 406 include one or more magnetic cores 416 surrounded by an inductor shielding 418. The magnetic cores 416 can be formed of a ferrite material and can extend through one or more layers of the heterogeneous interposer stack 401.

The transformer modular unit 404 includes one or more magnetic cores 420a and 420b surrounded by a transformer shielding 422. In at least one embodiment, a first magnetic core 420a corresponds to a first transformer circuit, while a second magnetic core 420b corresponds to a second transformer circuit.

Figure 5A:
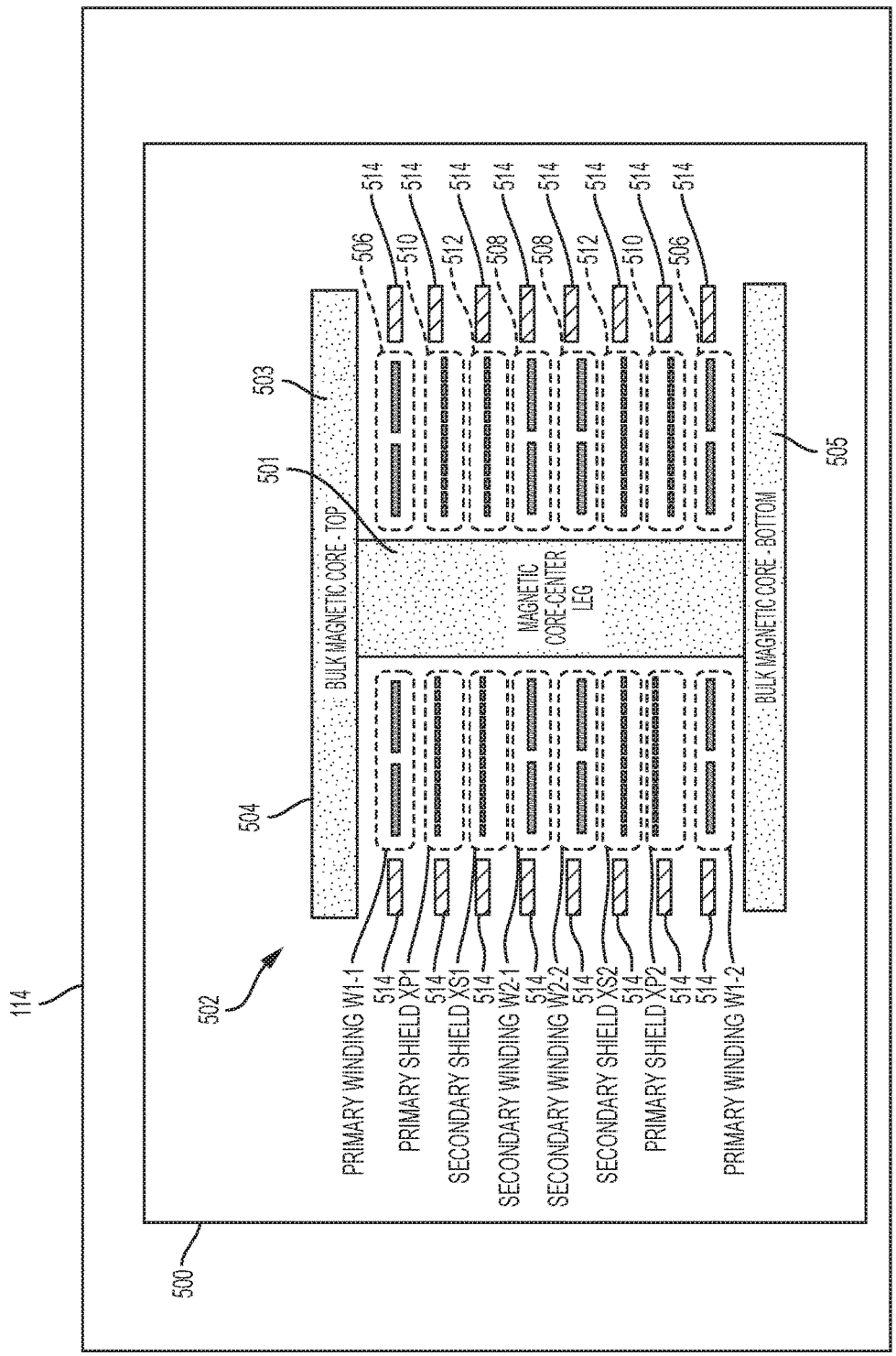
FIG. 5A is a block diagram of a modular transformer unit included in a modular-based DC/DC converter according to a non-limiting embodiment.
Figure 5B:
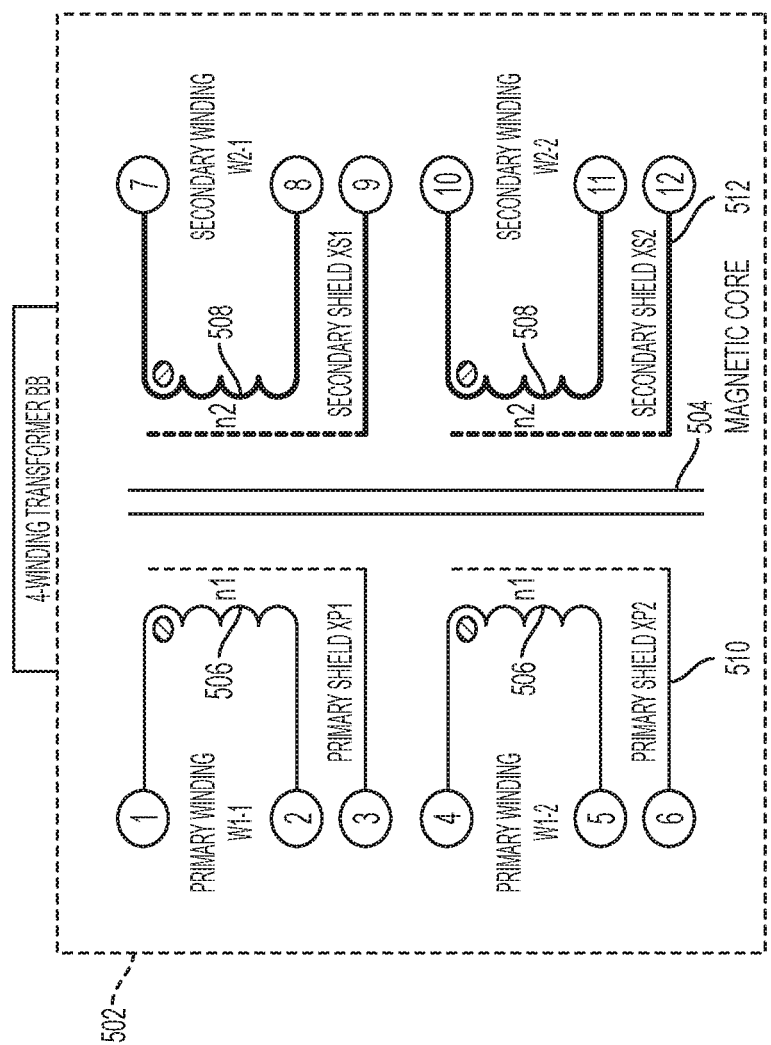
FIG. 5B is a schematic diagram of the modular transformer unit shown in FIG. 5A.

Turning now to FIGS. 5A and 5B, a modular transformer unit 500 included in a modular-based DC/DC converter 114 is illustrated according to a non-limiting embodiment. Although the modular transformer unit 500 is constructed as a four-winding transformer 502, the transformer architecture is not limited thereto. For instance, the transformer 502 can be constructed as an eight-winding transformer as described in greater detail below.

The four-winding transformer 502 includes a magnetic core 504, two primary windings 506, two secondary winding 508, two primary transformer shields 510, and two secondary transformer shields 512. The magnetic core 504 is constructed as a bulk core including a core leg 501 extending between an upper core portion 503 and a lower core portion 505. The bulk core can be composed of various magnetic materials such as, for example, a ferrite material.

The primary windings 506 each have a set number (n1) of winding turns, and the secondary windings 508 each have a set number (n2) winding turns. In at least one embodiment, the four-winding transformer 502 can include distributed core sides having a plurality of distributed core portions 514. Each distributed core portion 514 is separated from one another, and is horizontally aligned with a respective winding (e.g., 506 or 508) or shield (e.g., 510 or 512). A schematic diagram of the four-winding transformer 502 is illustrated in FIG. 5B.

Figure 6A:
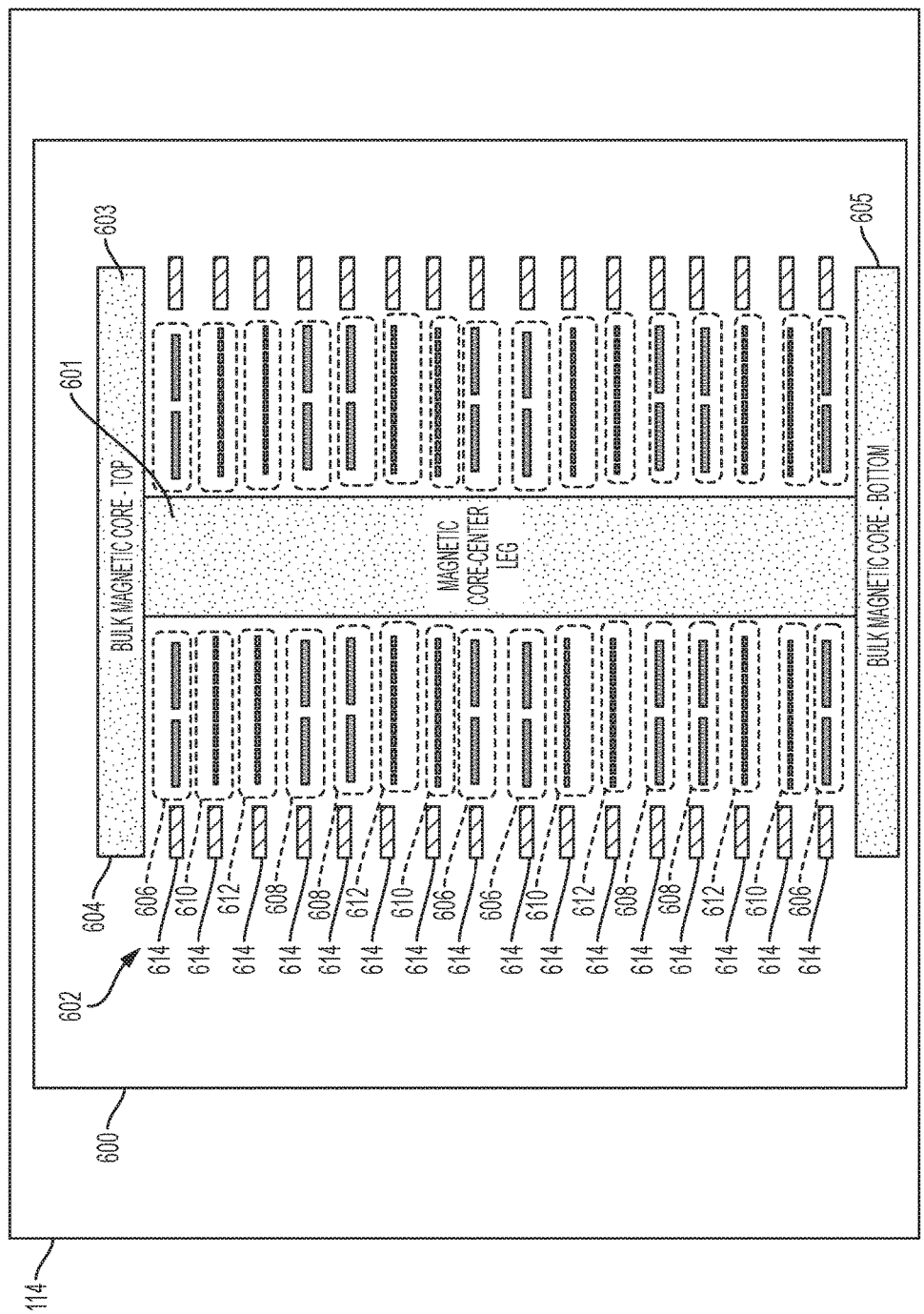
FIG. 6A is a schematic diagram of a modular transformer unit included in a modular-based DC/DC converter according to another non-limiting embodiment.
Figure 6B:
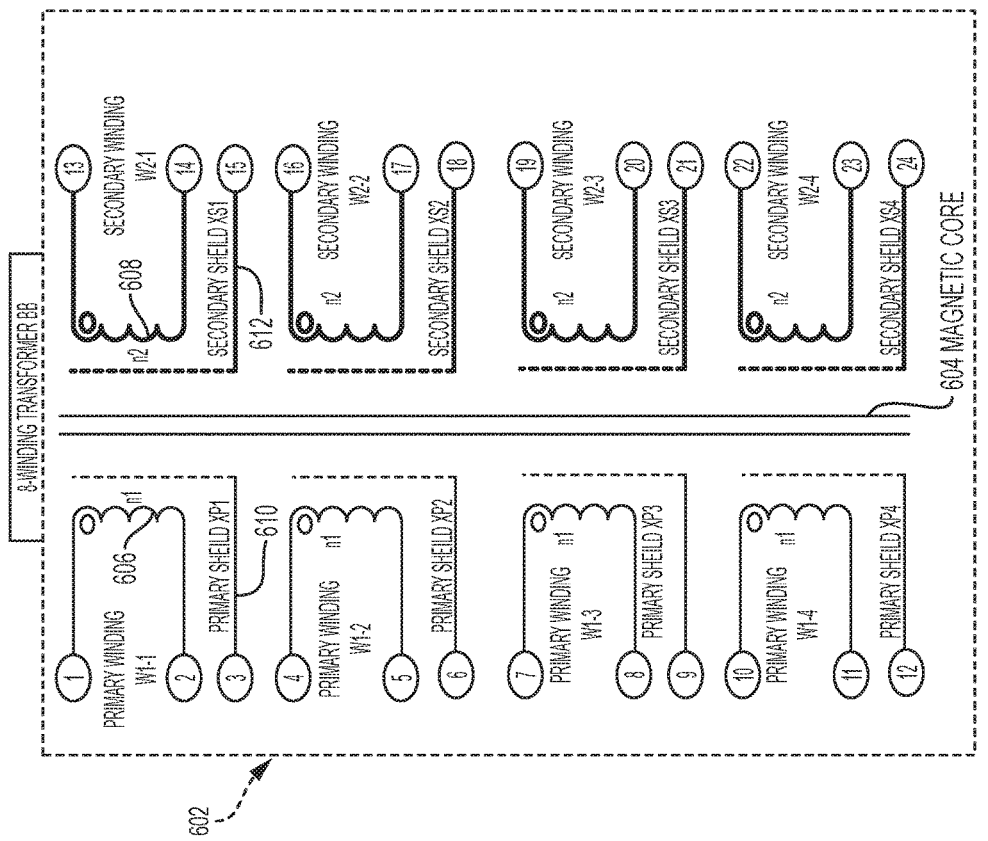
FIG. 6B is a schematic diagram of the modular transformer unit shown in FIG. 6A.

Referring to FIGS. 6A-6B, a modular transformer unit 600 is illustrated according to another non-limiting embodiment. In this example, the modular transformer unit 600 includes an eight-winding transformer 602. The eight-winding transformer 602 includes a magnetic core 604, four primary windings 606, four secondary winding 608, four primary transformer shields 610, and four secondary transformer shields 612. The magnetic core 604 is constructed as a bulk core including a core leg 601 extending between an upper core portion 603 and a lower core portion 605. The bulk core can be composed of magnetic materials such as, for example, a ferrite material.

The primary windings 606 each have a set number (n1) of winding turns, and the secondary windings 608 each have a set number (n2) of winding turns. In at least one embodiment, the eight-winding transformer 602 can include distributed core sides having a plurality of distributed core portions 614. Each distributed core portion 614 is separated from one another, and is horizontally aligned with a respective winding (e.g., 606 or 608) or shield (e.g., 610 or 612). A schematic diagram of the eight-winding transformer 602 is illustrated in FIG. 6B.

Figure 7A:
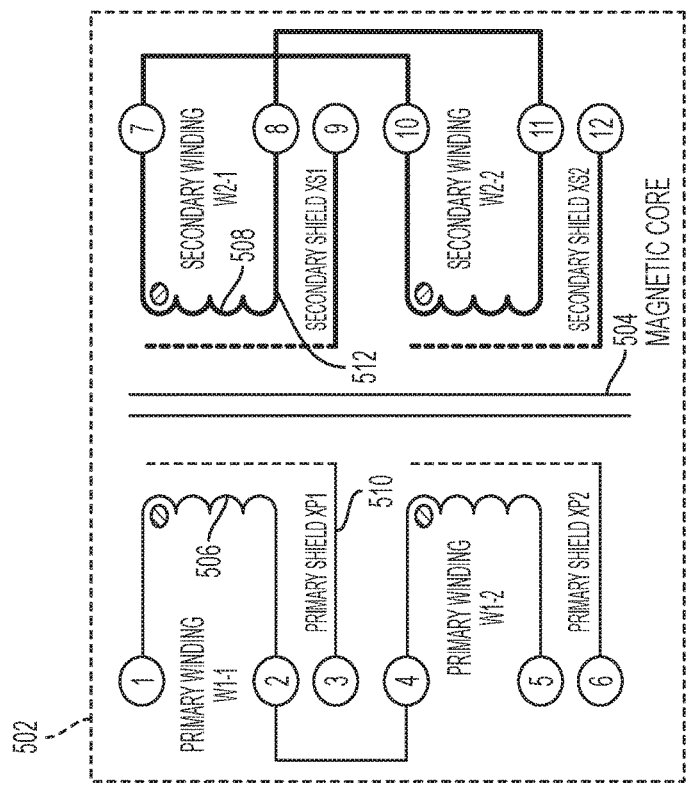
Figure 7B:
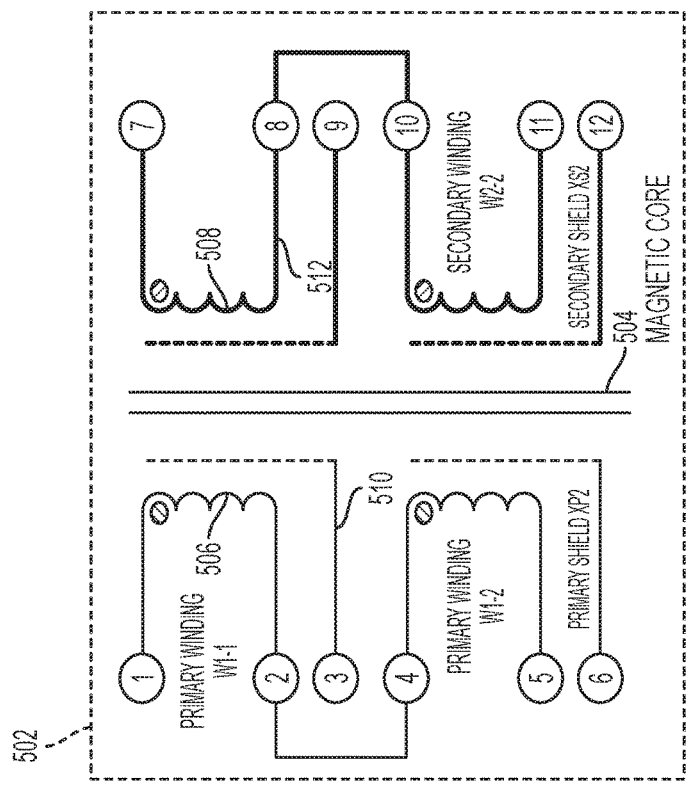

The four-winding transformer 502 or the eight-winding transformer 602 can be constructed according to various electrical connections. For example, FIGS. 7A-7D illustrate various electrical connections of the four-winding transformer 502 included in a modular transformer unit 500 as described above. FIG. 7A illustrates the four-winding transformer 502 constructed according to a Parallel Primary, Parallel Secondary (PPPS) connection architecture. FIG. 7B illustrates the four-winding transformer 502 constructed according to a Parallel Primary, Series Secondary (PPSS) connection architecture. FIG. 7C illustrates the four-winding transformer 502 constructed according to a Series Primary, Series Secondary (SPSS) connection architecture. FIG. 7D illustrates the four-winding transformer 502 constructed according to a Series Primary, Parallel Secondary (SPPS) connection architecture. The connection architectures of the modular transformer unit 500 can be freely changed using conductive jumpers accessible from the interposer (not shown in FIGS. 7A-7C). Accordingly, the modular transformer unit 500 can be dynamically reconfigured by changing the connections of the individual windings.

Turning now to FIG. 8A, a modular inductor unit 700 is illustrated according to non-limiting embodiment. The modular inductor unit 700 includes a one or more independent inductor cells 702a and 702b. Although two cells 702a and 702b are shown, it should be appreciated that more cells can be implemented in the modular inductor unit 700.

The inductor cells 702a and 702b illustrated in FIG. 8 are constructed according to a small footprint circuit architecture. Accordingly, each cell 702a and 702b includes a winding having a one or more wound portions 704 (i.e. turns) that surround a bulk magnetic core 705. The bulk magnetic core 705 has a core body 707 extending continuously between an upper core surface 709 and an opposing lower core surface 711. The upper core surface 709 can be located at the upper surface of an interposer (not shown in FIG. 8) and the lower core surface 711 can be located at the lower surface of the interposer such that the core body 707 extends through one or more intermediate substrate layers of the interposer.

In at least one embodiment, the inductor cells 702a and 702b can include distributed core sides having a plurality of distributed core portions 706. Each distributed core portion 706 is separated from one another, and is horizontally aligned with a respective wound portion 704.

The inductance of the modular inductor unit 700 varies based on the number of inductor cells 702a-702n that are connected to one another among the plurality of cells. For example, a single connected inductor cell 702a provides a minimum inductance. However, connecting all the inductor cells (e.g., cells 702a and 702b) in series with one another provides a maximum inductance. A switch 708 can be provided to selectively connect together one or more cells (e.g., the first cell 702a and the second cell 702b). Accordingly, the modular inductor unit 700 can operate "dynamically" because the switch 708 may actively reconfigure the modular inductor unit 700 during operation, "i.e., in real time", without shutting down (e.g., disconnecting from the prime power) the modular-based DC/DC converter 114. A schematic diagram of the modular inductor unit 700 is illustrated in FIG. 8B.

Figure 9B:
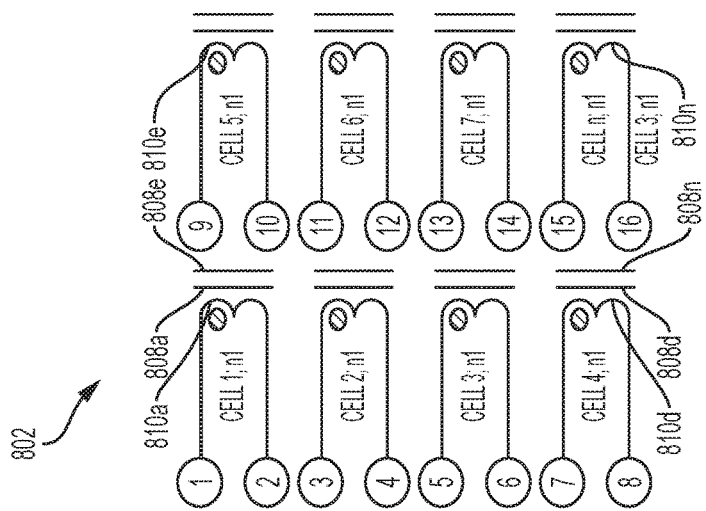
FIG. 9B is a schematic diagram of the modular inductor unit shown in FIG. 9A.
Figure 9A:
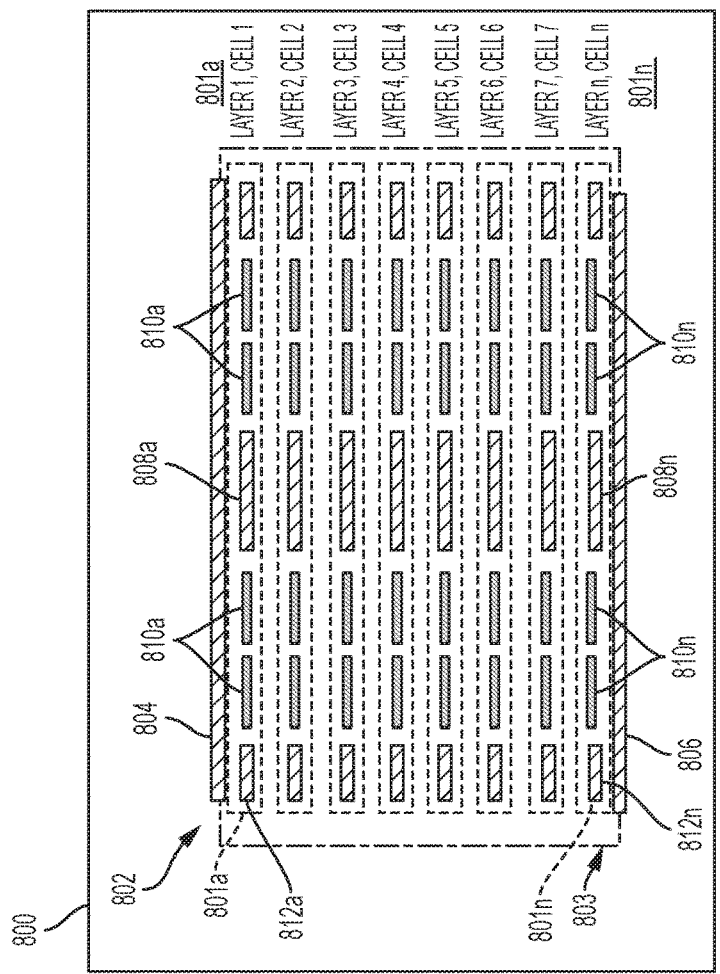
FIG. 9A is a block diagram of a modular inductor unit included in a modular-based DC/DC converter according to another non-limiting embodiment.

Referring to FIG. 9A, a modular inductor unit 800 is illustrated including an inductor circuit 802 constructed according to a large footprint circuit architecture. The large footprint circuit architecture distributes the inductor circuit 802 over a plurality of intermediate substrate layers 801a-801n included in an interposer 803. The inductor circuit 802 includes a distributed magnetic core having an upper an upper core segment 804, a lower core segment 806, and one or more intermediate core segments 808a-808n. The upper core segment 804 is located at the upper surface of the interposer 803 and the lower core segment 806 is located at a lower surface of the interposer 803. The intermediate core segments 808a-808n are separated from the upper core segment 804 and the lower core segment 806, and are located on a respective intermediate substrate layer 801a-801n of the interposer 803.

Each intermediate substrate layer 801a-801n includes a winding having one or more wound portions 810a-810n that surround a respective intermediate core segment 808a-808n. The inductor circuit 802 can also include distributed core sides having a plurality of distributed side-core portions 812a-812n. The distributed side-core portions 812a-812n are separated from one another, and is horizontally aligned with a respective wound portion 810a-810n.

In at least one embodiment, the connection architectures of the modular inductor unit 800 can be freely changed using conductive jumpers accessible from the interposer 803. Accordingly, the modular inductor unit 800 can be dynamically reconfigured by changing the connections of the individual cells formed at each intermediate substrate layer 801a-801n. A schematic diagram of the large footprint inductor circuit 802 is illustrated in FIG. 9B.

Figure 10:
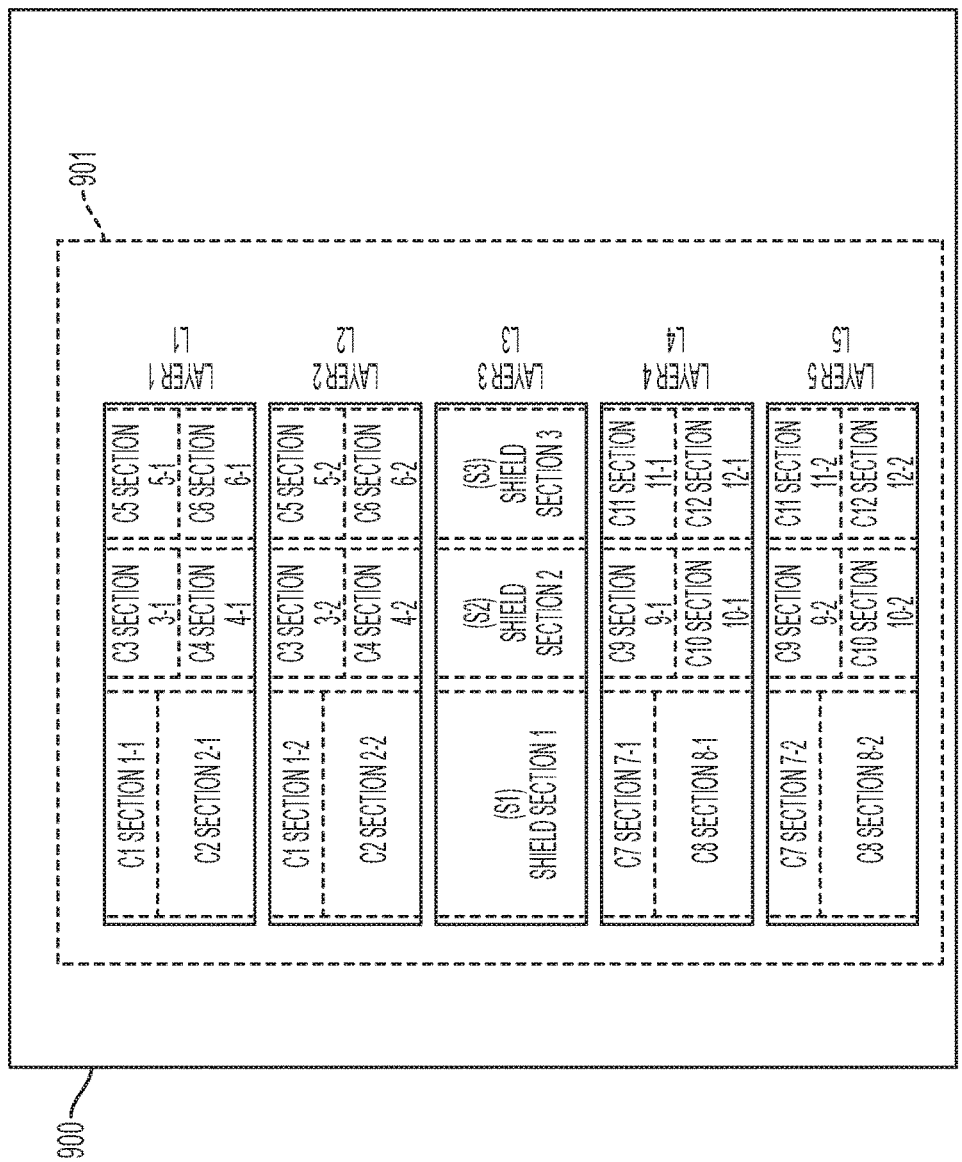
FIG. 10 is a schematic diagram of a modular capacitor unit included in a modular-based DC/DC converter according to a non-limiting embodiment.

Turning now to FIG. 10, a modular capacitor unit 900 is illustrated according to non-limiting embodiment. The modular capacitor unit 900 includes an interposer 901 having a plurality of intermediate substrate layers (L1, L2, L3, L4 and L5). The intermediate substrate layers can be composed of a metal material to form metalized layers L1-L5, which separated from one another. Although five metalized layers L1-L5 are illustrated in FIG. 10, less or more metalized layers can be included in the modular capacitor unit 900.

In at least one embodiment, a combination of metalized layers can form one or more capacitor circuits. For example, the combination of a first metalized layer L1 and a second metalized layer L2 forms capacitor circuits C1, C2, C3, C4, C5 and C6. A first section of a given capacitor circuit (e.g., section 1-1 of C1) can be formed on the first metalized layer L1, while a second section of the capacitor circuit (e.g., section 1-2 of C1) can be formed on the second metalized layer L2. Similarly, the combination of the fourth metalized layer L4 and the fifth metalized layer L5 forms capacitor circuits C7, C8, C9, C10, C11 and C12. As described above, a first section of a given capacitor circuit (e.g., section 7-1 of C7) can be formed on the fourth metalized layer L4, while a second section of the capacitor circuit (e.g., section 7-2 of C7) can be formed on the fifth metalized layer L5.

The third metalized layer L3 is interposed between the first set of metalized layers (e.g., L1 and L2) and the second set of metalized layers (L4 and L5), and can serve as a shielding layer. The shielding layer L3 according to the example shown in FIG. 10 includes a first shielding section S1, a second shielding section S2, and a third shielding section S3. Although three shielding sections S1-S3 are illustrated, it should be appreciated that more or less shielding sections can be included. The shielding sections S1-S3 can be composed of a conductive or magnetic material, for example, and can serve as an electric field shielding between the capacitor circuits formed in the first and second layers (e.g., C1-C7) and the capacitor circuits formed in the fourth and fifth layers (e.g., C7-C12). A given shielding section S1-S3 can be independently shaped to correspond with a capacitor circuit. One or more combinations of the capacitor circuits C1-C12 and shielding sections S1-S3 can form an integrated EMI filter.

Figure 11:
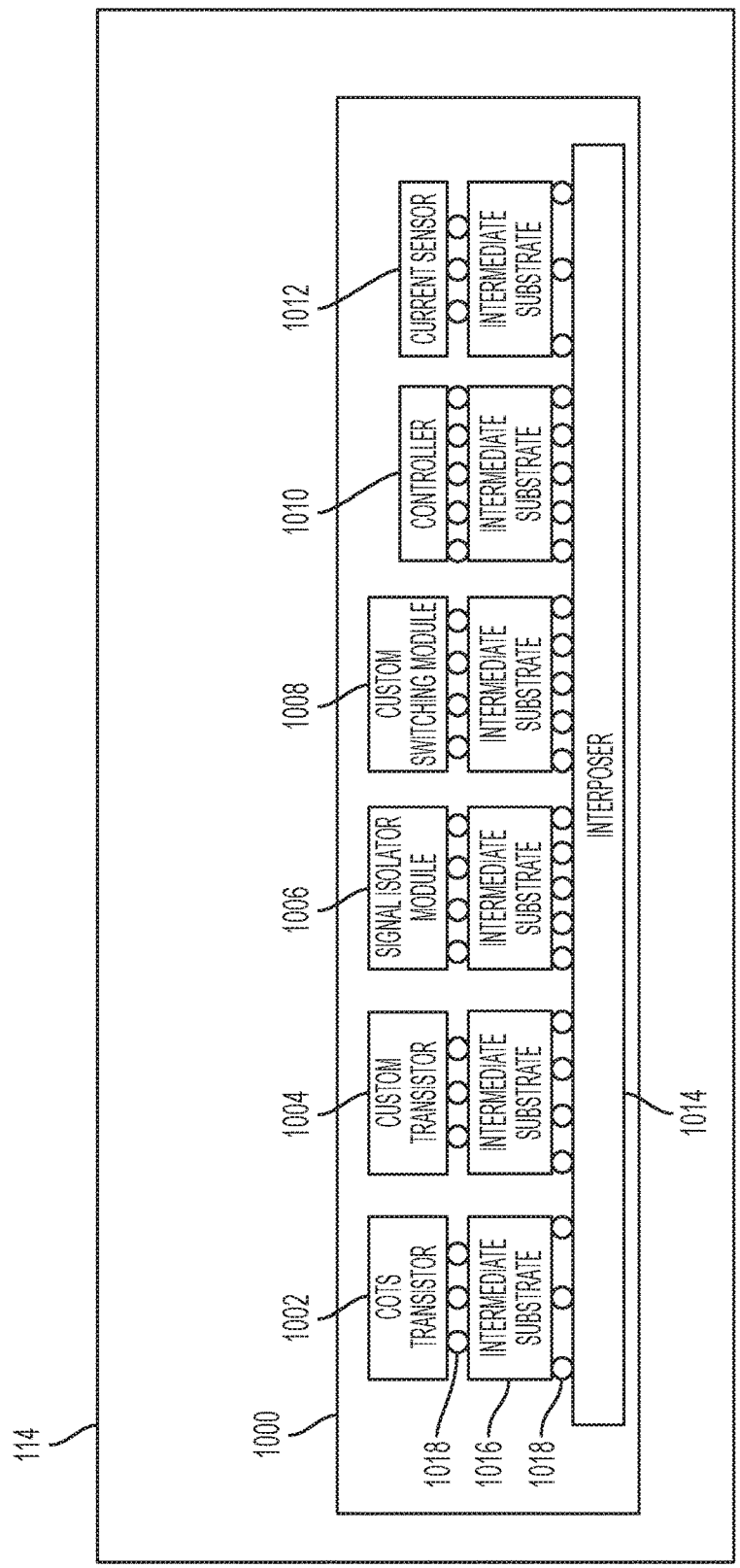
FIG. 11 is a block diagram illustrating a plurality of module active-electronic units on an interposer included in a modular-based DC/DC converter according to a non-limiting embodiment.

Turning now to FIG. 11, a modular active-electronic unit 1000 is illustrated according to a non-limiting embodiment. The modular active-electronic unit 1000 includes one or more modular active electronic components 1002, 1004, 1006, 1008, 1010 and 1012 on an interposer 1014 included in a modular-based DC/DC converter 114 according to a non-limiting embodiment. The one or more of the modular active electronic components 1002, 1004, 1006, 1008, 1010 and 1012 are configured to be replaceable and interchanged independently from one another. In the example illustrated in FIG. 11, The modular active electronic components include, but are not limited to, transistors or semiconductor switching devices, signal amplifiers, signal isolators, an electronic controller (e.g., a microcontroller), and sensors.

In at least one embodiment, the modular active electronic components 1002, 1004, 1006, 1008, 1010 and 1012 are mounted on an intermediate semiconductor substrate 1016 (e.g., a silicon substrate) via one or more mounting elements 1018 such as for example, a solder ball. The intermediate semiconductor substrate 1016 can then be coupled to the interposer 1014 via one or more mounting elements 1018. In at least one non-limiting embodiment illustrated in FIG. 11, the modular active-electronic unit 1000 can be reconfigured, as opposed to replaced, using the intermediate semiconductor substrate 1016. For example, the modular active-electronic unit 1000 can be reconfigured by decoupling a given intermediate semiconductor substrate 1016 from mounting elements 1018, and coupling a new given intermediate semiconductor substrate 1016 connected to a different or updated modular active electronic component.

Figure 12:
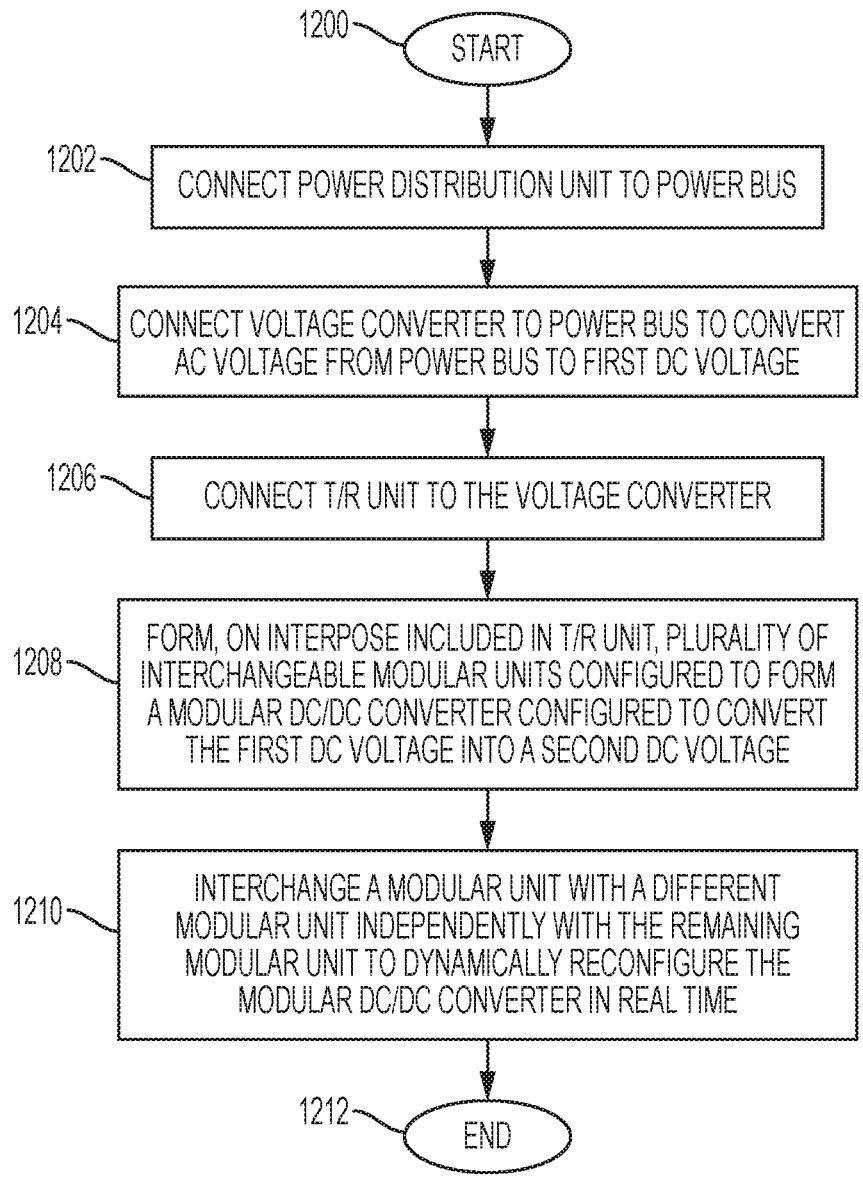
FIG. 12 is a flow diagram illustrating a method of assembling a plurality of modular converter units to construct a modular-based direct current-to-direct current (DC/DC) converter according to a non-limiting embodiment.

Turning now to FIG. 12, a flow diagram illustrates a method of assembling a plurality of modular converter units to construct a modular-based direct current-to-direct current (DC/DC) converter according to a non-limiting embodiment. The method begins at operation 1200, and at operation 1202, an electronic power distribution unit is connected to a power bus. The power bus is configured to receive an alternating current (AC) voltage output by the power distribution unit. At operation 1204, an electronic voltage converter unit is connected to the power bus. The voltage converter includes at least one alternating current-to-direct current (AC/DC). The AC/DC is configured to convert the AC voltage into a direct current (DC) voltage having a first DC voltage level. At operation 1206, at least one electronic transmitter and receiver (T/R) unit is connected to the output of the AC/DC. At operation 1208, a plurality of interchangeable modular converter units are formed on an interposer included on the T/R unit. The interchangeable module converter units are arranged to construct the modular-based DC/DC converter. The plurality of interchangeable modular converter units work in conjunction with one another to convert the DC voltage into a second DC voltage having a second voltage different from the first voltage level. At operation 1210, the modular-based DC/DC converter is dynamically reconfigured in real time in response to interchanging a first modular converter unit independently with respect to remaining modular converter units without disconnecting the modular-based DC/DC converter, and the method ends at operation 1212.

As described above, various non-limiting embodiments provide a modular high-power converter system that includes a modular-based DC/DC converter integrated in a transmitter/receiver (T/R) unit. The modular-based DC/DC converter includes one or more individual modular power converter units. Each individual modular power converter unit is interchangeable or can be swapped with respect to every remaining modular power converter unit implemented in a given modular-based DC/DC converter. In this manner the modular-based DC/DC converter can be dynamically reconfigured in real time without being disconnected. Accordingly, a more flexible high-power converter system is provided, which can easily adapt to evolving antenna technology and T/R systems. In addition, individual modular power converter units can be removed from a first modular DC/DC converter of a first vehicle, and then transferred and implemented into an entirely different vehicle.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" refers to an application specific integrated circuit (ASIC), an electronic circuit, a microprocessor, an arrangement of individual electronic circuits, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A modular high-power converter system comprising: an electronic power distribution unit configured to output an alternating current (AC) voltage to a power bus; and
    at least one Transmit or Receive Integrated Microwave Module (T/RIMM) configured to perform at least one of signal transmission or signal reception, the T/RIMM comprising:
    an electronic voltage converter unit including at least one alternating current-to-direct current converter (AC/DC) in signal communication with the power bus, the AC/DC configured to convert the AC voltage into a direct current (DC) voltage having a first DC voltage level,
    at least one electronic transmitter and receiver (T/R) unit in signal communication with the output of the AC/DC, the at least one T/R unit including a modular-based direct current-to-direct current (DC/DC) converter connected to the output of the AC/DC to convert the DC voltage into a second DC voltage having a second voltage different from the first voltage level,
    wherein the modular-based DC/DC converter includes a plurality of modular power converter units configured to generate the second DC voltage, each modular converter unit configured to be independently interchangeable with a different modular converter unit, each modular power converter unit configured to perform a different electronic power conversion operation with respect to one another, wherein each modular converter unit is configured to be independently removed without disconnecting the modular-based DC/DC converter.

2. The modular high-power converter system of claim 1, wherein a first individual modular power converter unit is configured to be independently interchangeable with respect to every remaining modular power converter unit.

3. The modular high-power converter system of claim 2, wherein the modular-based DC/DC converter includes an interposer substrate that supports the plurality of modular power converter units, the interposer forming an electrical routing interface among each modular power converter unit included in the plurality of modular power converter units.

4. The modular high-power converter system of claim 3, wherein the interposer includes at least one intermediate substrate layer located between an upper surface of the interposer and a lower surface of the interposer.

5. The modular high-power converter system of claim 4, wherein at least one of the modular converter units among the plurality of modular converter units is mounted on the interposer and extends through the at least one intermediate substrate layer.

6. The modular high-power converter system of claim 3, wherein the plurality of modular converter units includes at least one of a modular integrated input capacitor unit, a modular primary power switching unit, a modular transformer unit, a modular inductor unit, a modular secondary power switching unit, a modular controller and signal isolator unit, and a modular integrate output capacitor unit, a modular integrated output electromagnetic interference (EMI) filter unit, and a modular integrated sensor unit.

7. The modular high-power converter system of claim 6, wherein the modular transformer unit includes a magnetic core, primary windings, primary shields, secondary windings, and secondary shields.

8. The modular high-power converter system of claim 7, wherein the modular transformer unit is constructed as a four-winding transformer, the four-winding transformer including a magnetic core, two primary windings each having a first number of turns, and two secondary windings each having a second number of turns.

9. The modular high-power converter system of claim 7, wherein the modular transformer unit is constructed as an eight-winding transformer, the eight-winding transformer including a magnetic core, four primary windings each having a first number of turns, and four secondary windings each having a second number of turns.

10. The modular high-power converter system of claim 6, wherein the modular inductor unit includes a magnetic core and a plurality of independent inductor cells.

11. The modular high-power converter system of claim 10, wherein the modular inductor unit is dynamically reconfigured to vary an inductance in response to actively selecting a number of connected inductor cells among the plurality of independent conductor cells in real time without disconnecting the modular-based DC/DC converter.

12. The modular high-power converter system of claim 6, wherein the interposer includes a plurality of metalized layers, and the modular capacitor unit includes a plurality of individual capacitor circuits dispersed among the plurality of metalized layers.

13. The modular high-power converter system of claim 12, wherein the plurality of metalized layers includes at least one first capacitance layer, at least one second capacitance layer, and at least one shielding layer interposed between the at least one first capacitance layer and the at least one second capacitance layer, the shielding layer serving as an electric field shielding between the at least one first capacitance layer and the at least one capacitance layer second capacitor circuit.

14. An electronic transceiver/receiver (T/R) unit included in a Transmit or Receive Integrated Microwave Module (T/RIMM) installed in a modular high-power converter system, the comprising:
    a power amplifier connected to an antenna to perform at least one of signal transmission or signal reception; and
    a modular direct current-to-direct current (DC/DC) converter configured to convert a first DC voltage into a reduced second DC voltage that drives the power amplifier, the modular-based DC/DC converter including a plurality of modular power converter units configured to generate the second DC voltage, wherein each modular converter unit configured to be independently interchangeable with a different modular converter unit, each modular power converter unit configured to perform a different electronic power conversion operation with respect to one another, wherein each modular converter unit is configured to be independently removed without disconnecting the modular-based DC/DC converter.

15. The T/R unit of claim 14, wherein a first individual modular power converter unit is configured to be independently interchangeable with respect to every remaining modular power converter unit.

16. The T/R unit of claim 15, wherein the modular-based DC/DC converter includes an interposer substrate that supports the plurality of modular power converter units, the interposer forming an electrical routing interface among each modular power converter unit included in the plurality of modular power converter units.

17. The T/R unit of claim 16, wherein the interposer includes at least one intermediate substrate layer located between an upper surface of the interposer and a lower surface of the interposer, and at least one of the modular converter units among the plurality of modular converter units is mounted on the interposer and extends through the at least one intermediate substrate layer.

18. A method of assembling a plurality of modular converter units to construct a modular-based direct current-to-direct current (DC/DC) converter, the method comprising: connecting an electronic power distribution unit configured to a power bus that is configured to receive an alternating current (AC) voltage; connecting, to the power bus, an electronic voltage converter unit including at least one alternating current-to-direct current converter (AC/DC), the AC/DC configured to convert the AC voltage into a direct current (DC) voltage having a first DC voltage level; connecting at least one electronic transmitter and receiver (T/R) unit with the output of the AC/DC; forming a plurality of interchangeable modular converter units on an interposer included on the T/R unit to construct the modular-based DC/DC converter, the plurality of interchangeable modular converter units configured to convert the DC voltage into a second DC voltage having a second voltage different from the first voltage level, wherein the modular-based DC/DC converter is dynamically reconfigured in real time in response to interchanging a first modular converter unit independently with respect to remaining modular converter units without disconnecting the modular-based DC/DC converter.

* * * * *